Aug. 8, 1967                S. L. NATOF                3,334,595
              CONVEYOR CHAIN POWER TAKE-OFF UNIT
Filed Dec. 6, 1966                                 3 Sheets-Sheet 1
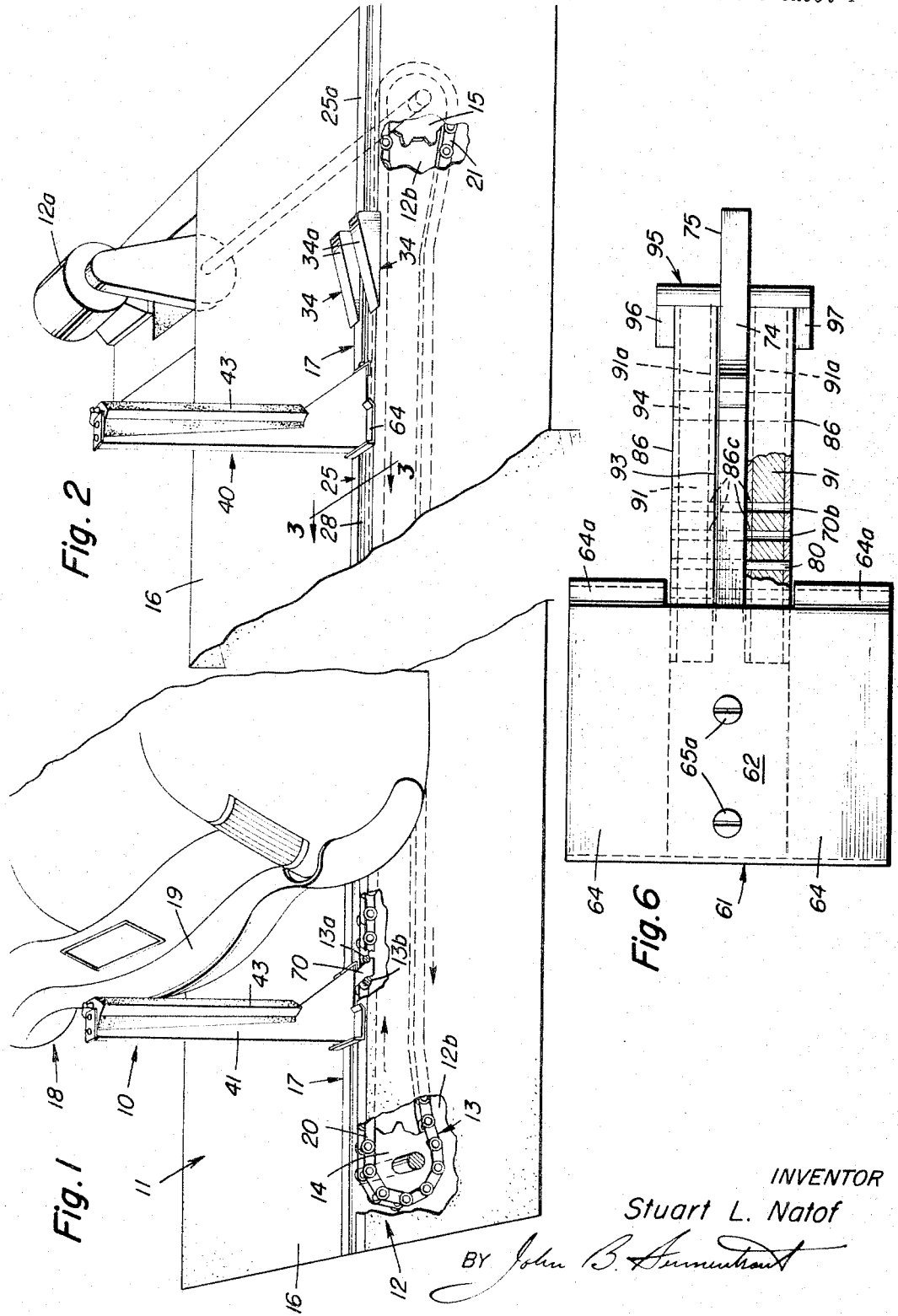
INVENTOR
Stuart L. Natof
BY John B. Summerhout
ATTORNEY

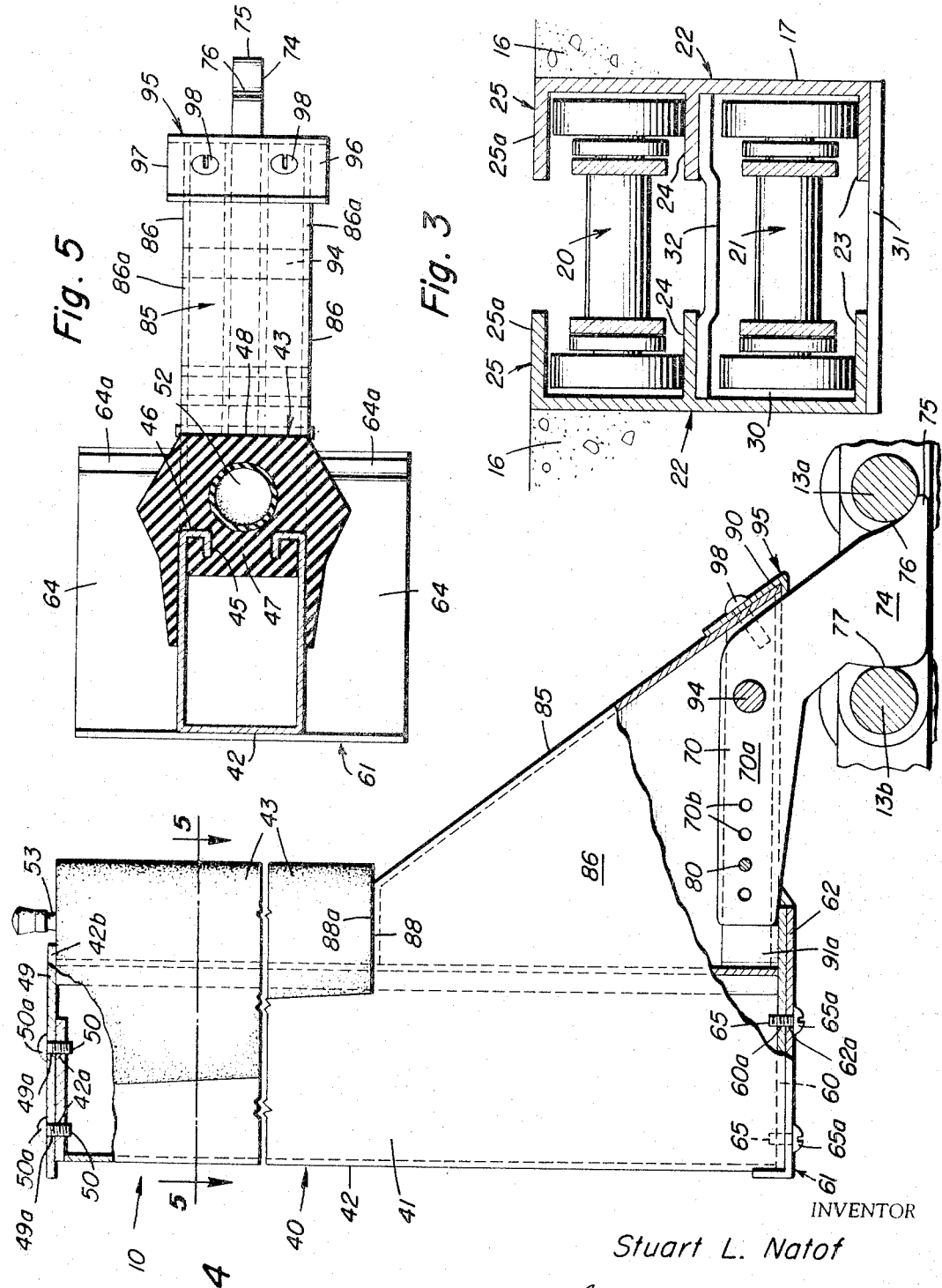

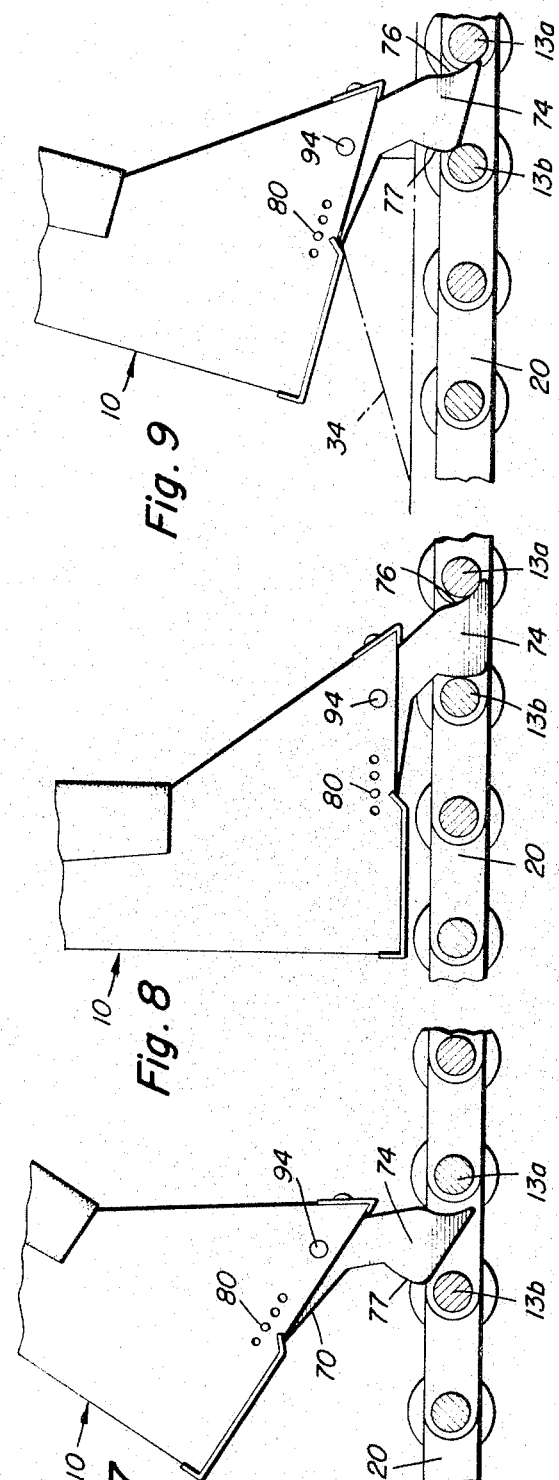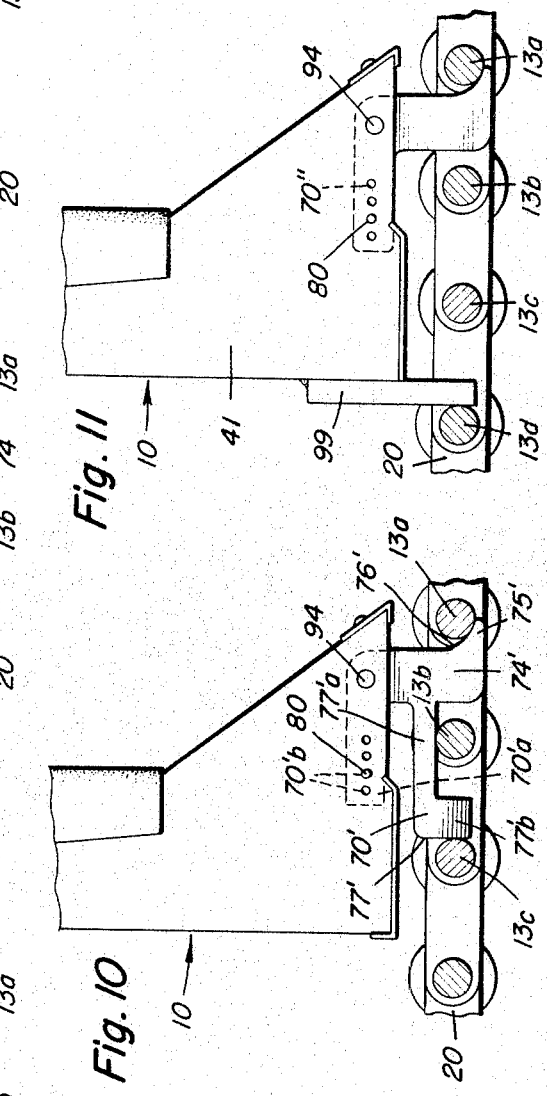

United States Patent Office 3,334,595
Patented Aug. 8, 1967

3,334,595
CONVEYOR CHAIN POWER TAKE-OFF UNIT
Stuart L. Natof, 80 Prospect St.,
Bernardsville, N.J. 07924
Filed Dec. 6, 1966, Ser. No. 599,449
12 Claims. (Cl. 104—172)

This invention relates to conveyors and power take off devices for association with conveyor chains and is more particularly concerned with a power take off unit which in attachment with a conveyor chain is capable of transmitting force from the chain to a work load for the work load to be advanced by operation of the chain.

As conducive to a clearer understanding of certain features of the present invention, it may be noted at this point that the advancement of a work load along a support surface through use of power from a suitably driven conveyor chain has called for the addition of a power take off member to the chain in order to transmit the thrust of the chain to the work load. The need for arrangements of this general sort has heretofore been recognized for accomplishing conveying operations with reference to a support surface such as the floor of a building. For example, an automobile vehicle in accordance with conventional practice for being washed, rinsed and dried is advanced for the purpose along a path from an initial station to a terminal station in a car wash establishment by means of an endless conveyor chain having its top flight recessed in a channel opening upwardly in the floor of the establishment to be available for power output through a power take off device, the application of power to the vehicle being begun at the initial station and discontinued at the terminal station.

In many types of conveying operations it has become important to engage a flight of a chain conveyor with the work load at the appropriate time and location, such as at an initial station of a car wash installation, to transmit drive from the chain to the load along a path coextending with the flight and to disengage automatically the power take off from the flight for discontinuing the drive at another location along the path such as at the terminal station of a car wash installation.

Attempts heretofore have been made to achieve propulsion throuugh hitching a tow line to a cross member between links of a chain conveyor and engaging the front of the load, such as the vehicle bumper, by means of a hook on the trailing end of the tow line. Practices of the latter sort have introduced numerous problems among which are to be found those having to do with inefficient direction of force application, and two much space being required by the hitch line on the length of the conveyor. Not only has it been necessary under the latter circumstances to effect a connection with the chain but a further connection by the attendant must be made with the front of the load itself. Other practices in the prior art have entailed the general principle of pushing under power taken from the chain conveyor and applied to the rear of the load, such as to the rear bumper of a vehicle. While many advantages in the latter respect are obtainable the prior art typically has required manipulation of the closure element of a clasp in proximity to the chain to secure the pusher device to the chain and for setting that closure element to be contacted for automatic release of the pusher device from the chain, or the prior art typically has been without provision for release of the pusher device from the chain except first to require shut down of the conveyor drive or to have the prerequisite met that the vehicle has in some way been relatively moved with respect to the pusher unit to be out of contact with the pusher unit.

An object of the present invention is the provision of a pusher unit having features whereby attachment of the unit to a conveyor chain is readily attained with maximum ease and minimum hazard to the attendant, which unit is well suited for transmitting power to a work load, such as a motor vehicle, which is to be advanced along a work surface while in driven connection with a flight of the conveyor chain by means of the pusher unit, the pusher unit furthermore being one which quite satisfactorily lends itself to being automatically released from the chain to discontinue the pushing function while operation of the chain itself may be continuously maintained.

Another object of this invention is that of providing a pusher unit of the character indicated which may be engaged with a chain conveyor by the simple expedient of being inserted into the chain manually by an attendant without any need for bringing the hands hazardously near the chain such as while the chain is in motion in its power operation, and which pusher unit is well equipped to respond to force automatically externally applied to release itself from the chain although up until the point of release the pusher unit effectively transmits a propulsion force to the work load.

Other objects in part will be obvious and in part pointed out more fully hereinafter.

In accordance with the present invention, a portable pusher unit is provided wherein upper lever structure has a forward face to contact and push a load, there being leading and trailing connector portions of the pusher unit for the leading connector portion to be inserted behind a cross bar of a conveyor chain, making it thus possible by angular movement of the pusher unit and the upper lever structure thereof backwardly about the cross bar to engage both the leading and trailing connector portions firmly with the crossbar structure of the conveyor chain for the forward face of the upper lever structure to contact a load and the pusher unit to move the load by thrust of the advancing chain. Moreover, the pusher unit has bearing structure which, with the leading and trailing connector portions engaged with the chain flight, is situated with reference to the aforementioned connector portions of the pusher unit for riding upon bearing surfaces of a support and finally ascending a ramp structure, the latter being disposed externally of the pusher unit so that the pusher unit advancing with the chain and pushing a load in contact with the forward face of the upper lever structure is tilted about the crossbar engaged by the leading connector portion for bringing the leading and trailing connector portions angularly into positions wherein the forward thrust of the chain and the backward thrust of the load being pushed cause the pusher unit to be automatically released from the chain.

In embodiments which are preferred, the pusher unit is adapted to be used in a conveying system wherein the flight of a conveyor to be coupled with the pusher unit passes in a gap formed between laterally opposite longitudinally coextending first portions of a support structure, there being bearing surfaces of the first portions of the support structure along opposite sides of the gap for the gap to receive the leading and trailing connector portions into engagement with crossbar structure of the conveyor chain flight and the bearing structure to ride upon the bearing surfaces of the first portions of the support structure, while the unit is pushing a load, and there being second portions of the support structure along the conveyor chain flight, including laterally spaced ramp components having bearing faces inclining upwardly from the bearing surfaces of the first portions of the support structure, the inclination of these bearing faces of the ramp components also being forwardly in the direction of advance of the flight, for the pusher unit coupled with the flight and pushing the load to have the bearing structure of the unit contact and ride upwardly upon the inclined bearing faces of the ramp components until the unit uncouples from the flight.

In the accompanying drawing representing several embodiments of the present invention and involving pusher units which readily lend themselves to use in conveying systems having the aforementioned support and ramp features:

FIGURE 1 is a fragmentary perspective view showing a pusher unit in pushing contact with a load at the input end of a conveying system;

FIGURE 2 is a fragmentary perspective view representing the pusher unit disconnect end of the conveying system of FIGURE 1;

FIGURE 3 is a transverse cross section of conveyor and housing structure as viewed in plane 3—3 in FIGURE 2;

FIGURE 4 is a side elevation partially in section to show the connector member in profile and represents the pusher unit also shown in FIGURES 1 and 2;

FIGURE 5 is a transverse cross section of the pusher unit as viewed in plan from plane 5—5 in FIGURE 4;

FIGURE 6 is a partially broken away bottom view of the pusher unit in FIGURE 4;

FIGURES 7, 8 and 9 are diagrams representing a sequence of positions which the connector portions of the pusher unit of FIGURE 4 occupy relative to the conveyor chain; FIGURE 7 more particularly being representative of an initial position toward achieving connection, FIGURE 8 being indicative of a connected position, and FIGURE 9 a disconnect position attainable on ramp components shown in FIGURE 2;

FIGURE 10 is a fragmentary view of a pusher unit in side elevation localized as to indicate details of a modified connector arrangement; and FIGURE 11 is a view similar to FIGURE 10 and indicating details of a further modification particularly with regard to connector arrangement.

Referring now more particularly to FIGURES 1 to 9 of the accompanying drawing a pusher unit 10 is associated with a support structure 11 upon which a load 18 (FIGURE 1) as for example a vehicle having a rear bumper 19 is to be advanced in contact with the pusher unit using for power the motor 12a of a conveyor 12. An endless chain 13 of the conveyor is on sprockets 14 and 15 which are rotatably mounted for the chain and the sprockets to be driven with reference to a concrete floor 16 of the support structure 11. Sprocket 14 more particularly is a drive sprocket in driven connection with the motor 12a, while sprocket 15 is an idler operating under the power of the endless chain. The sprockets 14 and 15 and chain 13 occupy positions below the surface 12a of the floor. It is the latter surface on which the load 18 is to travel while pushed from the rear by the pusher unit 10. Further, the support structure 11 includes a metallic housing 17 embedded in the concrete floor 16 and the housing extends longitudinally between the sprockets, having an upper passageway 29 for the forward flight 20 of the chain and a lower passageway 30 for the return flight 21 of the chain. To form the upper and lower passageways, E-members 22 of the housing are paired toward each other and spaced laterally apart having their lower flanges 23 (see FIGURE 3) and their intermediate flanges 24 in alignment and joined by lateral struts 31 and 32. The upper flanges 25 of the housing 11 thus are in laterally opposite positions having external surfaces 25a such as in the plane of surface 12a of the concrete floor 12, there being a gap 28 in the support structure 11 along the path which the load 18 is to follow and the gap being entrant intermediately of the adjacent ends 25b of the upper flanges and extending into and including the space between the E-members 22 in the upper passageway 29. Toward the advanced end of forward flight 20 (see FIGURE 2) there are laterally spaced ramp components 34 of the support structure 11 for automatically discontinuing the pushing action of the pusher unit against load 18 in a manner which will be explained more fully hereinafter. The ramp components 34 are suitably united with the upper flanges 25 of the housing 11 and have bearing faces 34a inclining upwardly from the external surfaces 25a of these flanges and forwardly in the direction of advance of the conveyor chain flight 20.

The pusher unit 10 (see FIGURE 4) is characterized by having upper lever structure 40 which includes leg portion 42 of a rigid frame 41 of the pusher unit and a resilient bumper 43. The leg portion 42 of the rigid frame is longitudinally channeled frontally in the pusher unit 10 and the leg portion 42 and resilient bumper 43 have laterally interfitting oppositely directed longitudinal flanges 45 and grooves 46 securing the bumper to the leg portion in a position wherein the bumper extends into the channel 47 of the leg portion and forms a forward face 48 of the upper lever structure 40 of the pusher unit. Forward face 48 is intended to contact the rear of load 18 such as the rear bumper 19 of an automobile vehicle for the pusher unit 10 connected with the flight 20 of the conveyor chain to push the load. Furthermore, in the present embodiment, a securing member 49 has apertures 49a through which machine screws 50 are driven in engagement with threads on the upper end of leg portion 42 in apertures 42a for heads 50a of the screws to bear upon the exterior of member 49 and demountably fasten this member in a position wherein a portion 42b of the member projects over the top end of bumper 43. For purposes of assembly, the bumper 43 is adapted to interengage laterally with the leg portion 42 when these members are telescoped together endwise having flanges 45 in the grooves 46. The securing member 49 is mounted in the aforementioned position after the latter assembly operation. The resilient bumper 43 is hollow and has extending within the hollow thereof an inflatable container 52, the container being equipped with a valve 53, which for example is a one-way check valve of a well known type for the container to be inflated and closed.

A bearing structure 61 of the pusher unit 10 is united with a heel 60 of the rigid frame 41 and is suited for riding upon surfaces 25a of the support structure 11 and upon faces 34a of the ramp components 34 of the support structure 11 during advance of the pusher unit 10 in pushing contact with load 18. The heel 60 is below the rigid leg portion 42 and is integral with the latter portion. More particularly in the present embodiment the bearing structure 61 includes skid structure. In an intermediate portion 62 of the skid structure there are apertures 62a aligned with apertures 60a leading upwardly in the heel 60 from the underneath side of the heel. Machine screws 65 extend shankwise through the apertures 62a and have cooperating threads engaging threads on the heel 60 in heel apertures 60a for heads 65a of the screws to maintain the skid structure and heel united. Moreover, skid members 64 of the skid structure extend outwardly oppositely beyond opposite sides of the heel 60 and have bottom facial areas to ride slidably upon surfaces 25a of the support structure 11 during advance of the pusher unit 10, and the skid members have forward faces on upwardly directed leading portions 64a thereof in the direction of advance of the conveyor chain flight 20 to contact and rise upon the inclined surfaces of the ramp components 34 during further advance of the pusher unit 10.

A first connector portion 74 of the pusher unit 10 is arranged for insertion into the gap 38 behind a leading crossbar 13a of the crossbar structure of flight 20 of the endless chain 13. For connecting the pusher unit 10 for pushing load 18 insertion of the first connector portion 74 is accomplished by having an attendant grasp the lever structure 40 of the pusher unit and then guide the first connector portion into gap 38 behind the load while the forward face 48 is toward the load. The first connector portion includes a forward end 75 and a backward declevity 76 forwardly of the bearing structure 61 in the direction of advance of the conveyor chain flight 20 for the first connector portion being inserted (see FIGURE 7) from behind the leading crossbar 13a to have the forward end 75 project under the leading crossbar 13a and the back of the latter received in the declevity 76. A second connector portion 77 of the pusher unit 10 is arranged rearwardly of the first connector portion 74 and inserted into the gap 38 rearwardly of the first connector portion facially to bear against the front of a crossbar 13b of the crossbar structure of flight 20 trailing the crossbar 13a and maintains (see FIGURE 8) the forward end 75 of the first connector portion under the leading crossbar 13a and the latter in the declevity 76. Pusher unit 10 accordingly has driven connection with the conveyor chain flight 20 and in this the bearing structure 61 contacts surfaces 25a of flanges 25 in the support structure 11. The upper lever structure 40 has forward face 48 move into contact with the rear of load 18 by advance of the pusher unit 10 with conveyor chain flight 20 under power of the conveyor motor 12a while the bearing structure 61 rides upon surfaces 25a of flanges 25 in the support structure 11 and the load accordingly contacted is propelled with the conveyor chain 13.

The second connector portion 77 is arranged to move angularly outwardly (see FIGURE 9) from the front of the trailing crossbar 13b about the leading crossbar 13a and with the first connector portion 74 to release the forward end 75 from the leading crossbar 13a in response to movement of the bearing structure 61 upon the inclined bearing faces 34a of the ramp components 34 for the pusher unit 10 to uncouple from the conveyor chain flight 20 while this flight is being advanced and the upper lever structure 40 is pushing the load 18.

The pusher unit in the present embodiment is further characterized by the feature that a connector member 70 includes both the first connector portion 74 and the second connector member 77, the connector member 70 being pivotally mounted and being associated with a shear pin 80 for arresting angular movement of the first and second connector portions about the axis of the pivotal mounting while the forward end 75 of the first connector portion projects under the leading crossbar 13a and the second connector portion 77 bears against the front of the trailing crossbar 13b. The second connector portion 77 includes a heel which in the latter position of the second connector portion is adapted to bear facially against the front of the trailing crossbar 13b, having this crossbar 13b be the next crossbar removed in a trailing direction in flight 20 from the leading crossbar 13a which is received in the declevity 76 in the first connector portion 74 and is engaged underneath by the forward end 75 of the first connector portion.

The rigid frame 41 has a hollow toe 85 forwardly of the leg portion 42 and heel 60. Opposite side wall portions 86 of the toe 85 are integral with the heel 60 and extend forwardly in a laterally spaced generally parallel relation in the pusher unit 10 under a top wall portion 88 of the toe. The top wall portion 88 of the toe forms a ledge 88a immediately in front of the leg portion 42 for supporting the bottom end of the resilient bumper 43 and thence is forwardly and downwardly inclined and is united with the side wall portions 86 to form forwardly and downwardly inclined corners 86a with these side wall portions to the tip 90 of the toe. A pair of opposite parallel bar members 91 at the bottom of toe 85 are disposed inside the spaced side wall portions 86 at the bottom and are secured to these wall portions, as by welding, and extend between heel 60 and the tip 90 of the toe in a direction which is about perpendicular to the longitudinal axis of the leg portion 42 of the rigid frame 41. The innermost parallel side faces 91a of the bar members 91 form a slot 93 longitudinally centrally in the bottom of the hollow toe 85 and leading between the heel 60 and the tip 90 of the toe. The connector member 70 associated with the shear pin 80 has a pivot pin 94 extending through aligned apertures in side walls 86 and in the bar members 91 and in the connector member itself and suitably secured to the rigid frame 41 for pivotally mounting the latter member to the rigid frame. An arm 70a of the connector member 70 is disposed in the slot 93 rearwardly of the pivot pin 94 and is mechanically on the opposite side of this pivot pin from the first and second connector portions 74 and 77 of member 70. Arm 70a has a series of transverse apertures 70b therein each at a different lever arm distance from the axis of pivot pin 94 and aligned with corresponding opposite pairs of apertures 86c in the side wall portions 86 of the hollow toe 85 for any selected pair of the apertures 86c and the corresponding aperture 70b to receive the shear pin 80 suitably secured to the rigid frame 41 to arrest angular movement of the connector member 70 about the axis of pivot pin 94.

The tip 90 of the toe 85 has guard structure 95 laterally outwardly for the toe tip 90 inclusive of the guard structure to extend over and beyond the gap 28 in the support structure 11 and the guard structure to contact the bearing surfaces 25a outside the gap. The guard structure in the embodiment represented includes an angular wing plate having a leg 95a secured by screws 98 through apertures therein and through apertures in top wall portion 88 of the toe to the walls of tapped openings in the forward ends of the bar members 91. A second leg 95b extends backward a short distance immediately beneath these same ends of the bar members 91. The forward end 75 of the first connector portion 74 is downward and forward with reference to the guard structure 85. Opposite outer ends 96 and 97 of the guard structure are on a dimension apart laterally of the toe tip 90, which dimension is less than the space between ramp components 34, whereby the guard structure 95 contacting the bearing surfaces 25a of the support structure limits the distance which the forward end 75 of the first connector portion 74 may be inserted into the gap 28 for reaching under the leading crossbar 13a and placing the back of this crossbar in the declevity 76 and, as the pusher unit is advanced coupled with the conveyor chain flight 20, the toe 85 inclusive of the guard structure 95 enters between the ramp components 34, permitting the leading portions 64a of the skid members 64 to contact and rise upon the bearing faces 34a of the ramp components until the second connector portion 77 moves angularly with the forward end 75 of the first connector portion about the leading crossbar 13a (FIGURE 9) and thus outwardly from the front of crossbar 13b, whereupon the pusher unit 10 pushing a load disengages from the conveyor chain flight 20.

Under conditions where the pusher unit 10 has the first connector portion 74 and the second connector portion 77 engaged with crossbars 13a and 13b in the manner hereinbefore described, and the pusher unit 10 is in pushing contact with an overload exceeding the tolerance of the shear pin 80, the shear pin fails in shear, and the upper lever structure 40 tilts backwardly with heel 60, allowing the connector member 70 meanwhile to move angularly relatively to the rigid frame 41 (clockwise in FIGURES 4 and 8) about the axis of pivot pin 94 and thus in a direction in which the first and second connector portions 74 and 77 retract from the respective crossbars 13a and 13b, whereupon the pusher unit 10 falls away free from the flight 20.

In certain embodiments in accordance with the present invention, connection and automatic release of the pusher unit with reference to the chain conveyor flight 20 are had through substituting for the connector member 70 a connector arrangement wherein a first connector portion of the pusher unit engages a leading crossbar in the flight, and a second connector portion rearwardly of the first connector portion is adapted to facially bear against the front of a trailing crossbar in the flight which is the next crossbar removed in a trailing direction from another crossbar which in the flight trails the leading crossbar. Thus, in the embodiment represented in FIGURE 10 a connector member 70', substituted on the pivot pin 94 for the connector member 70 of FIGURE 4, has an arm 70a' with a series of transverse apertures 70b' arranged in this arm to receive a shear pin 80 in the manner and for the purpose hereinbefore described. On the opposite mechanical side of the pivot pin 94 from arm 70a', the connector member includes a first connector portion 74' and a second connector portion 77'. Although the first connector portion 74' comprises a forward end 75' for insertion from behind and under a leading crossbar 13a in the conveyor chain flight 20 and has a backward declevity 76', the connector member 70' when fully engaged with the leading crossbar 13a remains terminally clear of the front face of crossbar 13b which next trails the crossbar 13a in flight 20. The second connector portion 77' is a generally L-shaped portion having the end of one leg 77a' thereof integral with the back of the first connector piston 74' so as to bridge over the crossbar 13b. Leg 77b' of the second connector member is arranged to bear laterally against the front crossbar 13c, the next crossbar trailing the crossbar 13b in the chain conveyor flight 20 so as to maintain the first connector portion 74' engaged with the crossbar 13a until the pusher unit automatically disconnects on the ramp components 34 or until pin 80 fails in shear in response to an overload.

In the embodiment of FIGURE 11, connection and automatic release of the pusher unit with reference to the chain conveyor flight 20, are had through substituting on the pivot pin 94 a connector member 70" which in all respects is similar to the connector member 70' of FIGURE 10 except that the rigid frame 41 of the pusher unit has a downward projection 99 which enters the gap 28 and bears facially against the front of crossbar 13d in the chain conveyor flight 20. The connector member 70", in a manner already described with reference to other embodiments herein, engages a leading crossbar 13a of the chain conveyor flight and is maintained in engagement by projection 99 which bears facially against the front of crossbar 13d for the purpose. The connection thus provided with the conveyor chain may be disrupted either by overload or by having the pusher unit ascend the ramp components 34.

As many possible embodiments of the present invention may be made and as many possible changes may be made in the embodiments hereinbefore set forth, it will be distinctly understood that all matter described herein is to be interpreted as illustrative and not as a limitation.

I claim:

1. A pusher unit adapted to be advanced separably coupled with crossbar structure of a conveyor chain flight to push a load and be automatically uncoupled from said crossbar structure and more particularly adapted to be used in combination with an arrangement wherein said flight passes in a gap formed between laterally opposite longitudinally coextending first portions of a support structure, there being bearing surfaces of said first portions along opposite sides of said gap and there being second portions of said support structure along said flight including laterally spaced ramp components having bearing faces inclining upwardly from said surfaces of said first portions while extending forwardly in the direction of advance of said flight, said pusher unit including, upper lever structure having a forward face for pushing contact with a load, a bearing structure united with said upper lever structure and suited for riding upon said bearing surfaces of said first portions of said support structure and upon said bearing faces of said ramp components during advance of the pusher unit, a first connector portion arranged for insertion into said gap behind a leading crossbar in said crossbar structure and including a forward end and a backward declevity forwardly of said bearing structure in the direction of advance of said conveyor chain flight for said first connector portion inserted from behind said leading crossbar to have said forward end project under said leading crossbar and the back of the latter received in said declevity, a second connector portion arranged rearwardly of said first connector portion and to be inserted into said gap rearwardly of said first connector portion facially to bear against the front of a crossbar of said crossbar structure trailing said leading crossbar and maintain said forward end of said first connector portion under said leading crossbar and the latter in said declevity when said upper lever structure is pushing a load by advance of said conveyor chain flight and said bearing structure is riding upon said bearing surfaces of said first portions of said support structure, and said second connector portion being arranged to move angularly outwardly from the front of said trailing crossbar about said leading crossbar and with said first connector portion to release said forward end of said first connector portion from said leading crossbar in response to movement of said bearing structure upon said inclined bearing faces of said ramp components for the pusher unit to uncouple from said conveyor chain flight while said flight is being advanced and said upper lever structure is pushing a load.

2. A pusher unit as set forth in claim 1, wherein said bearing structure includes skid structure for riding slidably upon said bearing surfaces of said first portions of said support structure, said skid structure including contactor portions rearwardly of said declevity in said first connector portion, in the direction of advance of said conveyor chain flight, for contacting and rising upon said bearing faces of said ramp components to lift said second connector portion for the pusher unit to uncouple from said conveyor chain flight while said flight is being advanced.

3. A pusher unit as set forth in claim 1, wherein a connector member includes said first connector portion and is pivotally mounted and is associated with a shear pin for arresting angular movement of said first connector portion about the axis of said pivotal mounting while said forward end of said first connector portion projects under said leading crossbar and said declevity receives the back of said leading crossbar and while said second connector portion facially bears against the front of said trailing crossbar, said shear pin and said first and second connector portions being arranged for said shear pin to fail in shear and said first connector portion to move angularly about said pivot axis for said first and second connector portions to release from said conveyor chain flight when said upper lever structure is urged by thrust from said conveyor chain flight into pushing contact with an overload.

4. A pusher unit as set forth in claim 3, wherein said second connector portion is a substantially immovably fixed portion of the pusher unit, and said first connector member in moving angularly about the axis of said pivotal mounting moves angularly with reference to said second connector portion.

5. A pusher unit as set forth in claim 1, wherein said first connector portion and said second connector portion are portions of a pivotally mounted connector member of the pusher unit, said connector member being arranged for insertion into said gap and associated with a shear pin and pivotally mounted for said shear pin to arrest angular movement of said connector member about the axis of said pivotal mounting while said forward end of said first connector portion projects under said leading crossbar and said declevity receives the back of said leading crossbar and while said second connector portion facially bears against the front of said trailing crossbar, said shear pin and said first and second connector portions being arranged for said shear pin to fail in shear and said first and second connector portions to move angularly about said pivot axis for said first and second connector portions to release from said conveyor chain flight when said upper lever structure is urged by thrust from said conveyor chain flight into pushing contact with an overload.

6. A pusher unit as set forth in claim 5, wherein said pivotally mounted connector member includes an arm mechanically on the opposite side of said pivotal mounting from said first and second connector portions, said arm having an aperture for said shear pin engaging said arm in said aperture to arrest angular movement of said first and second connector portions about the axis of said pivotal mounting.

7. A pusher unit as set forth in claim 6, wherein said connector member is arranged for said forward end of said first connector portion to project under said leading crossbar and have said declevity receive said leading corssbar while said second connector portion facially bears against the front of said trailing crossbar which is the next crossbar rearward in said chain conveyor flight in a trailing direction from said leading crossbar.

8. A pusher unit as set forth in claim 6, wherein said connector member is arranged for said forward end of said first connector portion to project under said leading crossbar and have said declevity receive said leading crossbar while said second connector portion facially bears against the front of said trailing crossbar which is the next crossbar removed in a trailing direction from another crossbar in said chain conveyor flight trailing said leading crossbar in said flight.

9. A pusher unit as set forth in claim 1, characterized by having a rigid frame and by having said upper lever structure include a rigid leg portion of said frame, there being a heel of said frame, and said bearing structure of the pusher unit comprising skid structure united with said heel, said skid structure extending outwardly oppositely beyond opposite sides of said heel to ride slidably upon said bearing surfaces of said first portions of said support structure and to contact and rise upon said bearing faces of said ramp components and lift the pusher unit into a position for the pusher unit to uncouple from said conveyor chain flight while said flight is being advanced, and the pusher unit being further characterized by said frame having a toe forwardly of said leg portion and heel, wall portions of said toe forming a bottom slot in said frame, and a connector member including said first connector portion of the pusher unit extends within said slot and is pivotally mounted on said toe, there being a shear pin in the pusher unit and said shear pin and said first connector portion being arranged for said shear pin interconnecting said connector member with said frame to arrest angular movement of said connector member about the axis of said pivotal mounting for said connector member to have said forward end of said first connector portion project below said bottom slot in said frame and under said leading crossbar and said declevity receive the back of said leading crossbar forwardly of said skid structure while said second connector portion facially bears against the front of said trailing crossbar and said upper lever structure is pushing a load, and said shear pin and said first and second connector portions are arranged in the pusher unit for said shear pin to fail in shear and said connector member to move angularly about said pivot axis for said pusher unit to uncouple from said conveyor chain flight when said upper lever structure is urged by thrust from said conveyor chain flight and is in pushing contact with an overload.

10. A pusher unit as set forth in claim 1, said upper lever structure includes a rigid leg portion and a resilient bumper, said rigid leg portion being longitudinally channeled frontally in the pusher unit and said rigid leg portion and resilient bumper having interfitting laterally oppositely directed longitudinal flanges and grooves securing said bumper to said leg portion in a position wherein said bumper extends into the channel of said leg portion and forms said forward face of said upper lever structure outside said channel.

11. A pusher unit as set forth in claim 10, wherein said resilient bumper is hollow and has extending within the hollow thereof an inflatable container, said container being equipped with a valve for said container to be inflated and closed.

12. A pusher unit as set forth in claim 9, wherein said toe has guard structure laterally outwardly for said toe inclusive of said guard structure to extend over and beyond said gap formed between said first portions of said support structure and said guard structure to contact said bearing surfaces of said first portions of said support structure outside said gap, the outer ends of said guard structure being on a dimension apart laterally of said toe which is less than the distance between said spaced ramp components, whereby said guard structure contacting said bearing surfaces of said first portions of said support structure limits the distance which said forward end of said first connector portion may be inserted into said gap for reaching under said leading crossbar and placing the back of said leading crossbar in said declevity and, as the pusher unit is advanced coupled with said conveyor chain flight, said toe inclusive of said guard structure enters between said ramp components, permitting said ends of said skid members to contact and rise upon said bearing faces of said ramp components until release of the pusher unit from said conveyor chain flight is had.

References Cited

UNITED STATES PATENTS 3,064,587   11/1962   O'Neal _____ 104—172

ANDRES H. NIELSEN, *Primary Examiner.*

RICHARD E. AEGERTER, *Assistant Examiner.*